United States Patent
Wicki et al.

(10) Patent No.: US 10,387,314 B2
(45) Date of Patent: Aug. 20, 2019

(54) REDUCING CACHE COHERENCE DIRECTORY BANDWIDTH BY AGGREGATING VICTIMIZATION REQUESTS

(71) Applicant: Oracle International Corporation, Redwood City, CA (US)

(72) Inventors: Thomas Wicki, Palo Alto, CA (US); Jurgen Schulz, Pleasanton, CA (US); Paul Loewenstein, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 348 days.

(21) Appl. No.: 14/834,628

(22) Filed: Aug. 25, 2015

(65) Prior Publication Data
US 2017/0060745 A1     Mar. 2, 2017

(51) Int. Cl.
G06F 12/08     (2016.01)
G06F 12/0831   (2016.01)
G06F 12/0817   (2016.01)

(52) U.S. Cl.
CPC ...... *G06F 12/0833* (2013.01); *G06F 12/0828* (2013.01); *G06F 2212/621* (2013.01)

(58) Field of Classification Search
CPC ............. G06F 12/0833; G06F 12/0828; G06F 12/817; G06F 12/0815; G06F 2212/621; G06F 12/0817; G06F 12/0815
See application file for complete search history.

(56) References Cited

U.S. PATENT DOCUMENTS

| | | | | |
|---|---|---|---|---|
| 4,797,814 A | * | 1/1989 | Brenza | G06F 12/0811 711/120 |
| 4,843,541 A | * | 6/1989 | Bean | G06F 9/4843 710/262 |
| 4,905,141 A | * | 2/1990 | Brenza | G06F 12/0846 711/129 |
| 5,893,160 A | * | 4/1999 | Loewenstein | G06F 12/0828 711/124 |
| 5,963,978 A | * | 10/1999 | Feiste | G06F 12/0811 710/39 |
| 5,983,326 A | * | 11/1999 | Hagersten | G06F 12/0813 711/140 |
| 6,044,438 A | * | 3/2000 | Olnowich | G06F 12/0813 707/999.201 |
| 6,061,765 A | * | 5/2000 | Van Doren | G06F 12/0815 711/141 |
| 6,108,737 A | * | 8/2000 | Sharma | G06F 9/30047 709/213 |
| 6,173,367 B1 | * | 1/2001 | Aleksic | G06F 12/0848 711/129 |

(Continued)

*Primary Examiner* — Ramon A. Mercado
(74) *Attorney, Agent, or Firm* — Meyertons, Hood, Kivlin, Kowert & Goetzel, P.C.

(57) ABSTRACT

A directory structure that may allow concurrent processing of write-back and clean victimization requests is disclosed. The directory structure may include a memory configured to store a plurality of entries, where each entry may include information indicative of a status of a respective entry in a cache memory. Update requests for the entries in the memory may be received and stored. A subset of previously stored update requests may be selected. Each update request of the subset of the previously stored update requests may then be processed concurrently.

18 Claims, 6 Drawing Sheets

(56) References Cited

U.S. PATENT DOCUMENTS

| | | | |
|---|---|---|---|
| 6,564,302 B1* | 5/2003 | Yagi | G06F 12/0817 711/122 |
| 6,604,174 B1* | 8/2003 | Dean | G06F 12/0844 711/118 |
| 7,447,843 B2* | 11/2008 | Ishikawa | G06F 12/084 711/129 |
| 7,590,803 B2 | 9/2009 | Wintergerst | |
| 8,180,975 B2* | 5/2012 | Moscibroda | G06F 9/4881 711/105 |
| 8,949,529 B2* | 2/2015 | Bellows | G06F 12/0802 711/118 |
| 9,158,689 B2* | 10/2015 | Solihin | G06F 12/082 |
| 9,223,709 B1* | 12/2015 | O'Bleness | G06F 12/0864 |
| 2002/0038407 A1* | 3/2002 | Mounes-Toussi | G06F 12/0815 711/141 |
| 2002/0152359 A1* | 10/2002 | Chaudhry | G06F 12/0817 711/141 |
| 2003/0079085 A1* | 4/2003 | Ang | G06F 12/0817 711/122 |
| 2004/0059875 A1* | 3/2004 | Garg | G06F 12/0806 711/141 |
| 2004/0088495 A1 | 5/2004 | Glasco et al. | |
| 2004/0103218 A1* | 5/2004 | Blumrich | G06F 9/52 709/249 |
| 2007/0038813 A1* | 2/2007 | Su | G06F 12/0817 711/141 |
| 2007/0079072 A1 | 4/2007 | Collier et al. | |
| 2009/0313435 A1* | 12/2009 | Thantry | G06F 12/0828 711/120 |
| 2010/0023695 A1 | 1/2010 | Guthrie et al. | |
| 2010/0235580 A1* | 9/2010 | Bouvier | G06F 12/084 711/129 |
| 2011/0060927 A1* | 3/2011 | Fillingim | G11C 5/141 713/320 |
| 2012/0151232 A1* | 6/2012 | Fish, III | G06F 15/7821 713/322 |
| 2014/0372696 A1* | 12/2014 | Tune | G06F 12/0846 711/114 |
| 2016/0019149 A1* | 1/2016 | Sivaramakrishnan | G06F 12/0811 711/122 |

* cited by examiner

REDUCING CACHE COHERENCE DIRECTORY BANDWIDTH BY AGGREGATING VICTIMIZATION REQUESTS

BACKGROUND

Technical Field

This invention relates to integrated circuits, and more particularly, to techniques for updating directory information once a cache line has been evicted from a cache memory of a processor.

Description of the Related Art

Computing systems typically include one or more processors or processor cores which are configured to execute program instructions. The program instructions may be stored in one of various locations within a computing system, such as, e.g., main memory, a hard drive, a CD-ROM, and the like. In some cases, a hierarchy of local memories or cache memories may be employed to store frequently accessed program instructions and data.

In particular, most processor cores will have at least a level one (L1) cache that is proximal to the core. In many cases, and especially in multi-core designs, a processor will also have a level two (L2) cache, and in some cases a level three (L3) cache. The L2 and L3 caches are in many cases shared among the various processor cores. The multiple cache hierarchies allow a processing system to keep copies of data that is accessed frequently in the local faster cache memory hierarchy, rather than having to access main memory, which is typically slower.

When a processor requests data or a program instruction that is not contained within a cache memory, a further request may be made to main memory for desired information. The processor may also request that the information be stored in the cache memory so that the information may subsequently be retrieved from the cache memory as opposed to main memory. Storing new information in a cache memory may be dependent upon available space within the cache memory. In cases where the cache memory is already storing its maximum number of cache lines, a line may need to be selected for removal (commonly referred to as "eviction" or "victimization") from the cache memory. Once a previously stored cache line has been selected and evicted from the cache memory, a new cache line may be stored.

When a processor or processor core updates data within a cache memory, the newly updated data in the cache memory may be copied back to system memory. This process is commonly referred to as "write-back."

SUMMARY OF THE EMBODIMENTS

Various embodiments of an apparatus and method for updating a directory are disclosed. Broadly speaking, a method and an apparatus are contemplated in which a memory is configured to store a plurality of entries. Each entry of the plurality of entries may include information indicative of a status of a respective entry in a cache memory. Circuitry may be configured to receive and store an update request, where the update request includes a request to update an entry of the plurality of entries. The circuitry may then select a subset of a plurality of previously stored update requests that may be processed concurrently. Each update request of the subset of the plurality of previously stored update requests may then be processed concurrently by the circuitry.

In a non-limiting embodiment, the memory may include a plurality of partitions. Each partition of the plurality of partitions may be configured to be accessed in parallel with at least one other partition of the plurality of partitions.

In one implementation, the memory may further include a plurality of First-In First-Out (FIFO) memories. Each FIFO of the plurality FIFO memories may be coupled to a respective partition of the plurality of partitions.

In another non-limiting embodiment, the circuitry may be further configured to store the update request in a given one of the plurality of FIFO memories.

Figure 1:
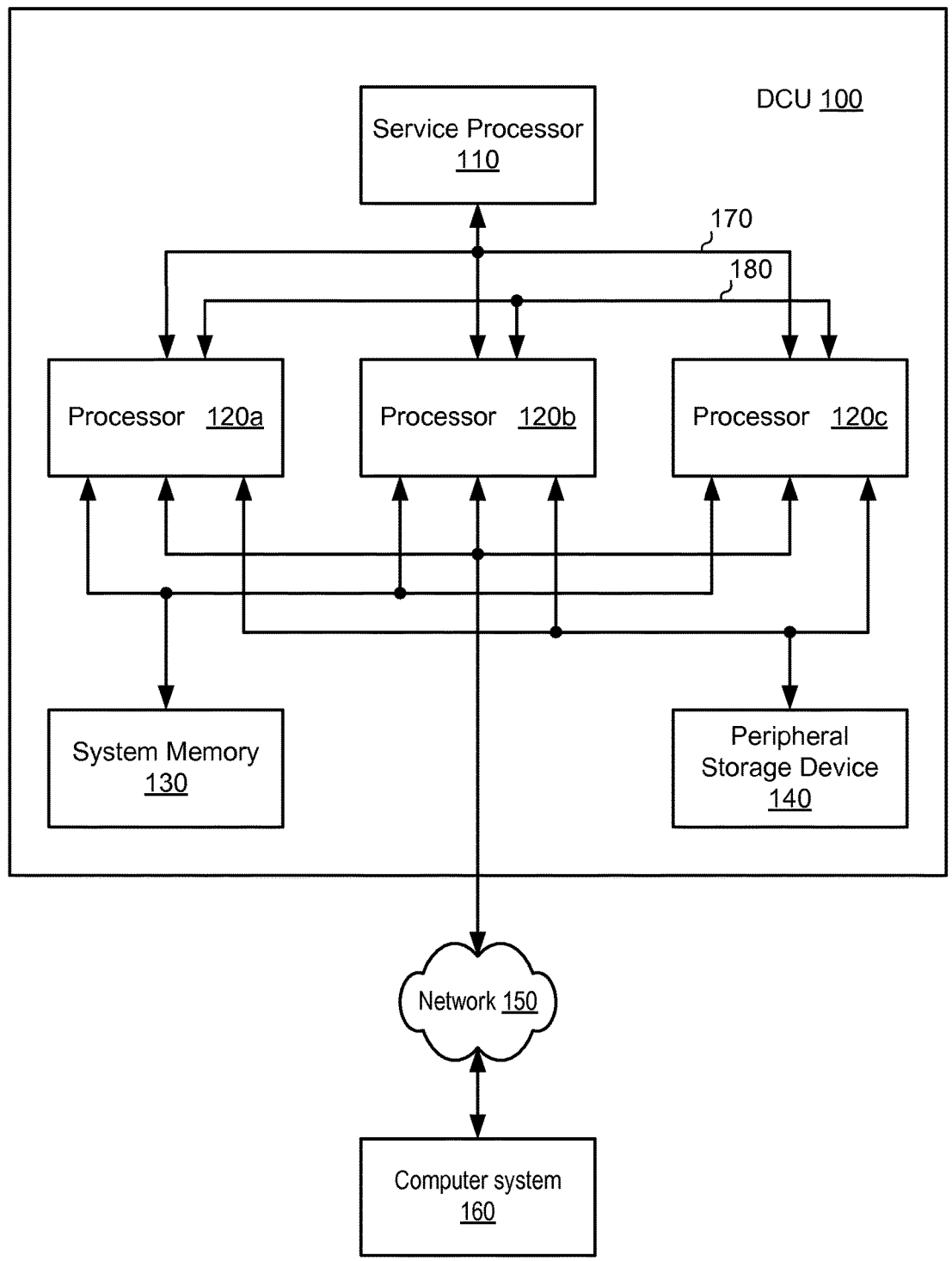
FIG. 1 illustrates a block diagram of an embodiment of a distributed computing unit.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f), interpretation for that unit/circuit/component.

DETAILED DESCRIPTION OF EMBODIMENTS

In computing systems a cache memory (or just a "cache") may be used to store frequently accessed program instructions or operands. When a large number of processors or processor cores are employed in a computing system, a cache may be partitioned so that each processor or processor core may have direct access to a portion of the cache. Other processors or processor cores may access other cache partitions through a network that passes requests and data between the various processor and cache memory partitions.

During operation, a processor or processor core may update information stored in a particular entry in a cache memory. The cache entry may then be marked as "dirty" indicating that the updated data included in the cache entry needs to be copied back to system memory when the cache entry is evicted. In some cases, other copies of the information stored in entries in different cache memories or cache partitions may be invalidated in order to preserve coherence amongst the various cache memories The process of copying information included in a dirty cache entry back to system memory, upon eviction of the dirty cache entry, is referred to herein as "write-back."

As a processor or processor core executes program instructions, it may be determined that it may be desirable to store new data in the cache memory. If there is no available space in the cache memory, a particular cache entry (also referred to herein as a "cache line") may be selected for removal from the cache memory. The process of removing such a selected cache line is commonly referred to as "eviction" or "victimization." If the selected cache line has been marked as dirty, then the victimization may be referred to as a "dirty victimization," and may include a write-back operation. Alternatively, if the selected cache line is not marked as dirty, then the victimization may be referred to as a "clean victimization."

Clean victimizations and write-backs may be performed in an explicit manner. In order to maintain performance when employing explicit write-back operations, additional coherence engines may be employed which may increase both area and power consumption. The embodiments illustrated in the drawings and described below may provide techniques for aggregating directory updates for cache line eviction requests (both clean and dirty), while limiting the impact on area and power consumption.

Distributed Computing Unit

A block diagram illustrating one embodiment of a distributed computing unit (DCU) 100 is shown in FIG. 1. In the illustrated embodiment, DCU 100 includes a service processor 110, coupled to a plurality of processors 120*a-c* through bus 170. It is noted that in some embodiments, service processor 110 may additionally be coupled to system memory 130 through bus 170. Processors 120*a-c* are, in turn, coupled to system memory 130, and peripheral storage device 140. Processors 120*a-c* are further coupled to each other through bus 180 (also referred to herein as "coherent interconnect 180"). DCU 100 is coupled to a network 150, which is, in turn coupled to a computer system 160. In various embodiments, DCU 100 may be configured as a rack-mountable server system, a standalone system, or in any suitable form factor. In some embodiments, DCU 100 may be configured as a client system rather than a server system.

System memory 130 may include any suitable type of memory, such as Fully Buffered Dual Inline Memory Module (FB-DIMM), Double Data Rate, Double Data Rate 2, Double Data Rate 3, or Double Data Rate 4 Synchronous Dynamic Random Access Memory (DDR/DDR2/DDR3/DDR4 SDRAM), or Rambus® DRAM (RDRAM®), for example. It is noted that although one system memory is shown, in various embodiments, any suitable number of system memories may be employed.

Peripheral storage device 140 may, in some embodiments, include magnetic, optical, or solid-state storage media such as hard drives, optical disks, non-volatile random-access memory devices, etc. In other embodiments, peripheral storage device 140 may include more complex storage devices such as disk arrays or storage area networks (SANs), which may be coupled to processors 120*a-c* via a standard Small Computer System Interface (SCSI), a Fiber Channel interface, a Firewire® (IEEE 1394) interface, or another suitable interface. Additionally, it is contemplated that in other embodiments, any other suitable peripheral devices may be coupled to processors 120*a-c*, such as multi-media devices, graphics/display devices, standard input/output devices, etc.

In one embodiment, service processor 110 may include a field programmable gate array (FPGA) or an application specific integrated circuit (ASIC) configured to coordinate initialization and boot of processors 120*a-c*, such as from a power-on reset state. Additionally, in some embodiments, service processor 110 may include a programmable read-only memory (PROM) that may store instructions to perform a power-on self-test (POST). In various embodiments, service processor 110 may be configured to allow access to administrative functions such as test and debug modes of processors 120*a-c*, such as testing cache memories in processors 120*a-c*, or providing test code to processors 120*a-c* such that each of processors 120*a-c* may test their respective cache memories, for example.

As described in greater detail below, each of processors 120*a-c* may include one or more processor cores and cache memories. In some embodiments, each of processors 120*a-c* may be coupled to a corresponding system memory, while in other embodiments, processors 120*a-c* may share a common system memory. Processors 120*a-c* may be configured to work concurrently on a single computing task and may communicate with each other through coherent interconnect 180 to coordinate processing on that task. For example, a computing task may be divided into three parts and each part may be assigned to one of processors 120*a-c*. Alternatively, processors 120*a-c* may be configured to concurrently perform independent tasks that require little or no coordination among processors 120*a-c*.

The embodiment of the distributed computing system illustrated in FIG. 1 is one of several examples. In other embodiments, different numbers and configurations of components are possible and contemplated. It is noted that although FIG. 1 depicts a multi-processor system, the embodiments described herein may be employed with any number of processors, including a single processor core.

Processor Overview

Figure 2:
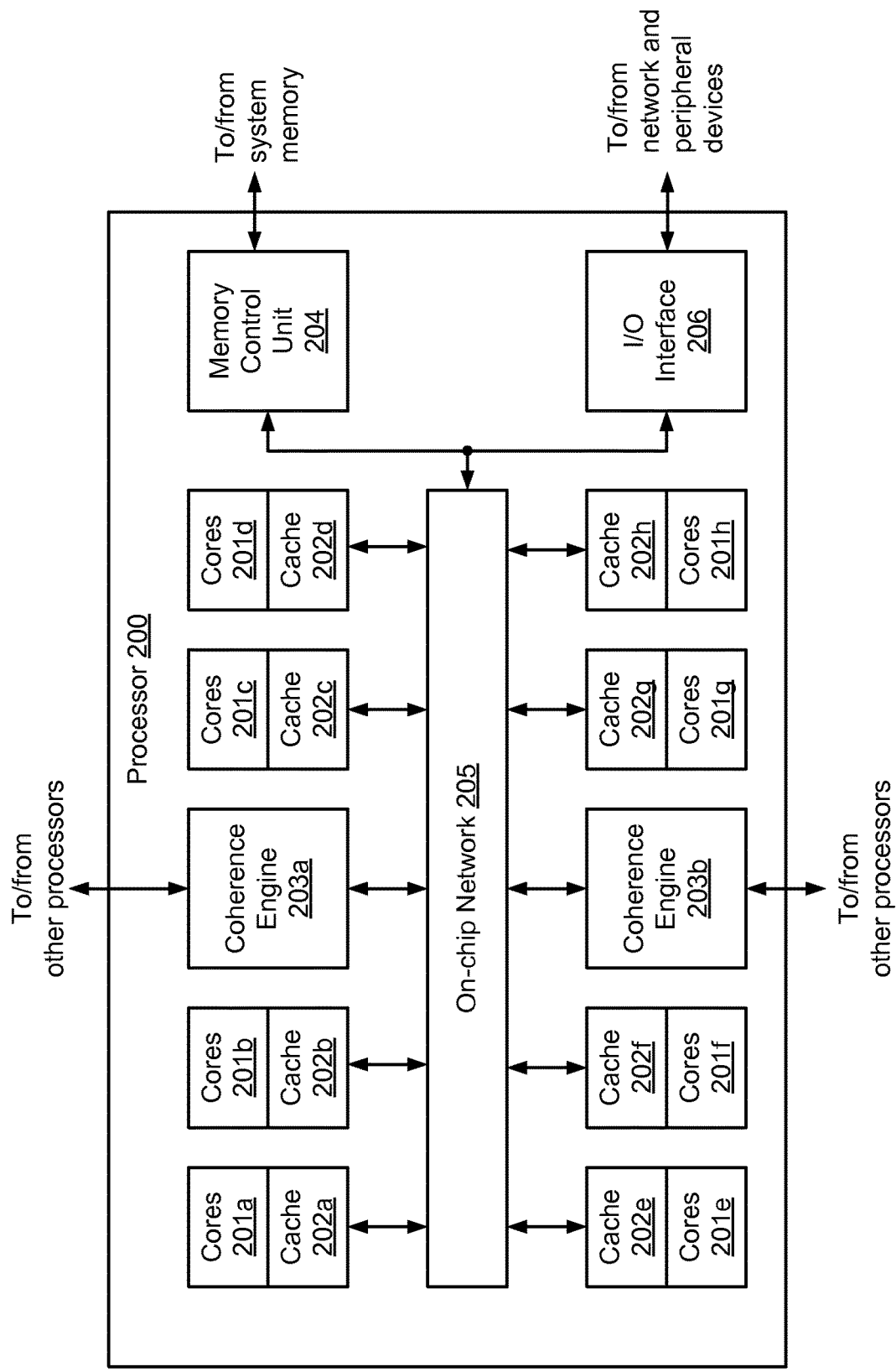
FIG. 2 depicts a block diagram of an embodiment of a processor.

A block diagram illustrating one embodiment of a processor 200 is shown in FIG. 2. In some embodiments, processor 200 may correspond to processors 120*a-c* of DCU 100 in FIG. 1. In the illustrated embodiment, processor 200 includes a plurality of processor core groups 201*a-h*, each including one or more processor cores. It is noted that although 8 core groups are shown, in various embodiments, any suitable number of processor cores may be employed. Each of core groups 201*a-h* is coupled to a respective one of cache memory partitions 202*a-h*. Collectively, cache memory partitions 202*a-h* form a cache memory for the core groups 201*a-h*. Each of cache memory partitions 202*a-h* is coupled to on-chip network 205, which is, in turn coupled to memory control unit 204. In various embodiments, memory control unit 204 is coupled to one or more banks of system memory, also referred to herein as main memory (not shown). Processor 200 further includes coherence engines 203*a-b* which are also coupled to on-chip network 205 as well as to other processors. In some embodiments, the elements included in processor 200 may be fabricated as part of a single integrated circuit (IC), for example on a single semiconductor die.

Each of core groups 201a-h may include one or more processor cores, and be configured to execute instructions and to process data according to a particular instruction set architecture (ISA). In one embodiment, core groups 201a-h may be configured to implement the SPARC® V9 ISA, although in other embodiments it is contemplated that any desired ISA may be employed, such as x86, PowerPC® or MIPS®, for example. In the illustrated embodiment, each of core groups 201a-h may be configured to operate independently of the others, such that all core groups 201a-h may execute in parallel. Additionally, in some embodiments each of core groups 201a-h may be configured to execute multiple threads concurrently on a separate processor core, where a given thread may include a set of instructions that may execute independently of instructions from another thread. (For example, an individual software process, such as an application, may consist of one or more threads that may be scheduled for execution by an operating system.) In one embodiment, each of core groups 201a-h may be configured to concurrently execute instructions from eight threads, for a total of 64 threads concurrently executing across processor 200. In other embodiments, however, it is contemplated that other numbers of core groups 201a-h may be provided, and that core groups 201a-h may concurrently process different numbers of threads.

On-chip network 205 may allow communication between cache memory partitions 202a-h, external resources through memory control unit 204, and I/O interface 206, and other processors through Coherence Engine 203a-b. Although not directly connected to on-chip network 205, core groups 201a-h may indirectly communicate with the external resources through cache memory partitions 202a-h. In some embodiments, multiple communication protocols may be implemented within on-chip network 205. For example, on-chip network 205 may include a ring network, a point-to-point network, and a store-and-forward network. In various embodiments, different types of communications, such as, e.g., requests, may be transmitted over different networks. It is noted that although on-chip network 205 is depicted as coupling processors to memory controllers, in other embodiments, a similar type of bus may be employed to couple multiple processing cores to a hierarchy of cache memories, or other functional blocks, within a single processor.

Cache memory partitions 202a-h may, in various embodiments, collectively form a level 3 (L3) cache memory for processor 200. By using separate cache memory partitions, an individual processor core group, such as, e.g., core group 201a may have high-speed access to data stored in its associated cache memory partition 202a, thereby reducing latency. In such a system, however, the multiple cache memory partitions need to maintain coherence with respect to each other. Cache memory partitions 202a-h may, in various embodiments, implement one of numerous coherence protocols, such as, e.g., MOESI, MESI, or any suitable cache coherence protocol.

Each of cache memory partitions 202a-h may be configured to cache instructions and data for use by core groups 201a-h. In the illustrated embodiment, each of cache memory partitions 202a-h may be separately addressable and independently accessed, may concurrently return data to a respective core of core groups 201a-h. In some embodiments, each individual cache memory partition may be implemented using set-associative or direct-mapped techniques. For example, in one embodiment, each of cache memory partitions 202a-h may be a 8 megabyte (MB) cache, although other cache sizes and organizations are possible and contemplated.

Each of cache memory partitions 202a-h may be implemented, in some embodiments, as a writeback cache in which written (dirty) data may not be written to system memory, or another cache, until a corresponding cache line is evicted. Cache memory partitions 202a-h may each be designed according to one of various design styles. For example, in some embodiments, a given cache memory partition may include Static Random Access Memory (SRAM) data storage cells, while, in other embodiments, such a partition may include dynamic, latched-based, or any other suitable type of data storage cell.

Memory control unit 204 may be configured to manage the transfer of data between cache memory partitions 202a-h and system memory, for example in response to fill requests and data evictions. In some embodiments, multiple instances of memory control unit 204 may be implemented, with each instance configured to control a respective bank of system memory. Memory control unit 204 may be configured to interface to any suitable type of system memory, such as described above in reference to FIG. 1 In some embodiments, memory control unit 204 may be configured to support interfacing to multiple different types of system memory.

In the illustrated embodiment, processor 200 may also be configured to receive data from sources other than system memory, such as, another processor, for example. Such data may be received using I/O interface 206, or through one of coherence engines 203a-b. I/O interface 206 may be configured to provide a central interface for such sources to exchange data with core groups 201a-h, while coherence engines 203a-b may be configured to allow the exchange of data with other processors, or those processor's cache or main memories. In some embodiments, I/O interface 206 may be configured to coordinate Direct Memory Access (DMA) transfers of data between external peripherals and system memory via coherence engines 203a-b and memory control unit 204. In one embodiment, I/O interface 206 may be configured to couple processor 200 to external boot and/or service devices. For example, initialization and startup of processor 200 may be controlled by an external device (such as, e.g., a FPGA) that may be configured to provide an implementation- or system-specific sequence of boot instructions and data. Such a boot sequence may, for example, coordinate reset testing, initialization of peripheral devices and initial execution of processor 200, before the boot process proceeds to load data from a disk or network device. Additionally, in some embodiments such an external device may be configured to place processor 200 in a debug, diagnostic, or other type of service mode upon request.

I/O interface 206 may be configured to coordinate data transfer between processor 200 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, I/O interface 206 may implement one or more instances of an interface such as Peripheral Component Interface Express (PCI Express™), although it is contemplated that any suitable interface standard or combination of standards may be employed. For example, in some embodiments I/O interface 206 may be configured to implement a version of Universal Serial Bus (USB) protocol or IEEE 1394 (Firewire®) protocol in addition to or instead of PCI Express™.

Figure 3:
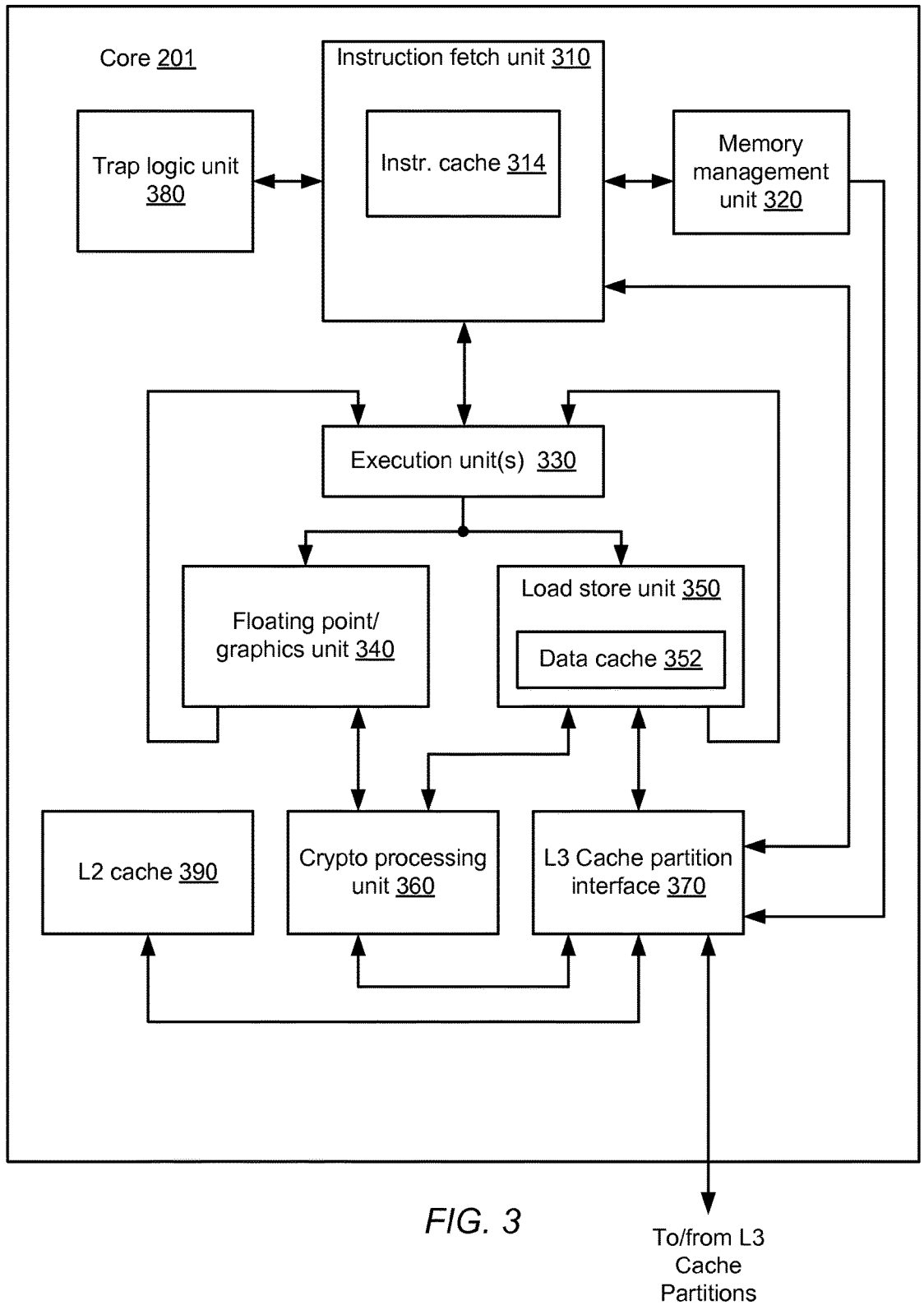
FIG. 3 illustrates a block diagram of an embodiment of a processor core.

I/O interface 206 may also be configured to coordinate data transfer between processor 200 and one or more devices (e.g., other computer systems) coupled to processor 200 via a network. In one embodiment, I/O interface 206 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, I/O interface 206 may be configured to implement multiple discrete network interface ports Core Overview A possible embodiment of core included in core groups 201a-h is illustrated in FIG. 3. In the illustrated embodiment, core 201 includes multiple functional units, such as an instruction fetch unit (IFU) 310 coupled to a memory management unit (MMU) 320, a L3 cache partition interface 370, a trap logic unit (TLU) 380, a L2 cache memory 390, and one or more of execution units 330. Execution unit 330 is coupled to both a floating point/graphics unit (FGU) 340 and a load store unit (LSU) 350. Each of the latter units is also coupled to send data back to each of execution units 330. Both FGU 340 and LSU 350 are coupled to a crypto processing unit 360. Additionally, LSU 350, crypto processing unit 360, L2 cache memory 390 and MMU 320 are coupled to L3 cache partition interface 370, which may in turn be coupled to on-chip network 205 as shown in FIG. 2.

Instruction fetch unit 310 may be configured to provide instructions to the rest of core 201 for execution. In the illustrated embodiment, IFU 310 may be configured to perform various operations relating to the fetching of instructions from cache or memory, the selection of instructions from various threads for execution, and the decoding of such instructions prior to issuing the instructions to various functional units for execution. Instruction fetch unit 310 further includes an instruction cache 314.

Execution unit 330 may be configured to execute and provide results for certain types of instructions issued from IFU 310. In one embodiment, execution unit 330 may be configured to execute certain integer-type instructions defined in the implemented ISA, such as arithmetic, logical, and shift instructions. It is contemplated that in some embodiments, core 201 may include more than one execution unit 330, and each of the execution units may or may not be symmetric in functionality. Finally, in the illustrated embodiment instructions destined for FGU 340 or LSU 350 pass through execution unit 330. However, in alternative embodiments it is contemplated that such instructions may be issued directly from IFU 310 to their respective units without passing through execution unit 330.

Floating point/graphics unit 340 may be configured to execute and provide results for certain floating-point and graphics-oriented instructions defined in the implemented ISA. For example, in one embodiment FGU 340 may implement single- and double-precision floating-point arithmetic instructions compliant with a version of the Institute of Electrical and Electronics Engineers (IEEE) 754 Standard for Binary Floating-Point Arithmetic (more simply referred to as the IEEE 754 standard), such as add, subtract, multiply, divide, and certain transcendental functions. Also, in one embodiment FGU 340 may implement partitioned-arithmetic and graphics-oriented instructions defined by a version of the SPARC® Visual Instruction Set (VIS™) architecture, such as VIS™ 2.0.

Load store unit 350 may be configured to process data memory references, such as integer and floating-point load and store instructions. In some embodiments, LSU 350 may also be configured to assist in the processing of instruction cache 314 misses originating from IFU 310. LSU 350 may include a data cache 352 as well as logic configured to detect cache misses and to responsively request data from a particular one of L3 cache partitions 202a-h via L3 cache partition interface 370. In one embodiment, data cache 352 may be configured as a write-through cache in which all stores are written to a given one of L3 cache partitions 202a-h regardless of whether they hit in data cache 352; in some such embodiments, stores that miss in data cache 352 may cause an entry corresponding to the store data to be allocated within the cache. In other embodiments, data cache 352 may be implemented as a write-back cache.

L2 cache memory 390 may be configured to cache instructions and data for use by execution unit 330. In the illustrated embodiment, L2 cache memory 390 may be organized into multiple separately addressable banks that may each be independently accessed. In some embodiments, each individual bank may be implemented using set-associative or direct-mapped techniques.

L2 cache memory 390 may be implemented in some embodiments as a write-back cache in which written (dirty) data may not be written to the L3 cache or system memory until a corresponding cache line is evicted. L2 cache memory 390 may variously be implemented as single-ported or multi-ported (i.e., capable of processing multiple concurrent read and/or write accesses). In either case, L2 cache memory 390 may implement arbitration logic to prioritize cache access among various cache read and write requestors.

It is noted that the embodiment illustrated in FIG. 3 is merely an example. In other embodiments, different functional units and different arrangements of functional units are possible and contemplated.

Coherence Processing

Figure 4:
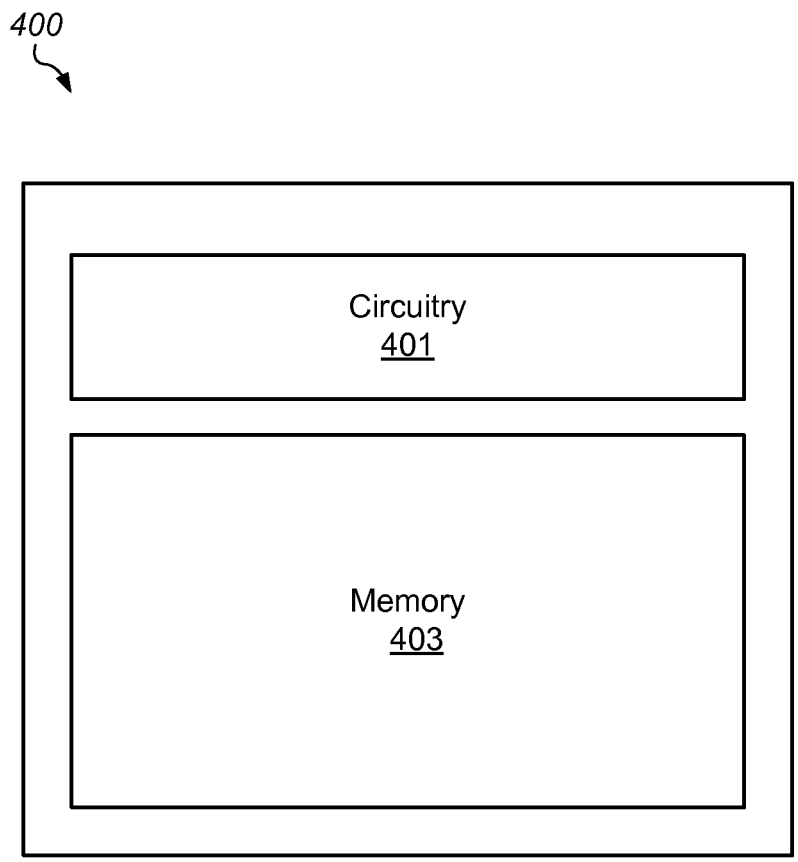
FIG. 4 depicts a block diagram of an embodiment of a cache memory partition.

Turning to FIG. 4, an embodiment of a partition of a cache memory is illustrated. In the illustrated embodiment, cache memory partition 400 includes circuitry 401, and memory 403. In some embodiments, cache memory partition 400 may correspond to any of cache partitions 202a-h as illustrated in FIG. 2.

Memory 403 may, in various embodiments, include multiple data storage cells, such as, dynamic storage cells, static storage cells, non-volatile storage cells, or any suitable data storage cell. In some embodiments, memory 403 may include dual-port data storage cells allowing read and write operations to be performed in parallel. It is noted that although only a single memory is depicted in cache memory partition 400, in other embodiments, any suitable number of memories may be employed.

Circuitry 401 may include a combination of logic gates configured to perform specific tasks, such as, e.g., receive a request for data from a processor core, such as, core 201a of FIG. 2, for example. In some embodiments, circuitry 401 may include one or more state elements, such as, e.g., flip-flops or latches, which may be included in a sequential logic circuit (commonly referred to as a "state machine") configured to perform various tasks relating to the operation of cache memory 400. Circuitry 401 may, in other embodiments, include a general-purpose processor configured to execute program instructions. While circuitry 401 is shown, in the illustrated embodiment, as being included in cache memory partition 400, in some embodiments, the circuitry may be located in another functional unit or may be shared with another cache memory partition.

During operation, circuitry 401 may receive a request for data from a processor or processor core directed to memory 403. Circuitry 401 may determine that the requested data is stored in memory 403. In such cases (commonly referred to as a "cache hit"), circuitry 401 may retrieve the requested data from memory 403, and send the requested data to the processor or processor core. In some cases, circuitry 401 may determine the requested data is not currently stored in memory 403 (commonly referred to as a "cache miss").

In the event of a miss for a memory 403, circuitry 401 generates a request for the data from another cache memory partition. In some embodiments, circuitry 401 may send the request via a communication network, such as, on-chip network 205 as illustrated in FIG. 2, for example. Such a request may, in some embodiments, be processed by a coherence engine, such as, e.g., coherence engine 203a as depicted in FIG. 2. The coherence engine may determine if the requested data is available in another cache memory partition, and, if so, send a request to a cache memory partition storing the requested data, to send the requested data to the requesting entity. In other embodiments, the request sent by circuitry 401 may travel to each cache memory partition, and each cache memory partition may send an appropriate response upon determining if the requested data is available. The updated value may, in various embodiments, include information indicative of which cache memory partition contained the requested data.

If the requested data is unavailable in other cache memory partitions, a request for the data may be sent to a directory which tracks the status of other processor's cache memories. The coherence engine hosting the directory may then determine if the requested data is available from another processor's cache memory or if the requested data needs to be retrieved from system memory. If the requested data is available in other cache memory partitions, a request for the data may be sent to the cache memory storing the requested data. In cases where the data is not available in another processor's cache memory, a request may be transmitted via an on-chip network to a memory control unit, such as, e.g., memory control unit 204 as depicted in FIG. 2. The memory control unit may forward the request onto one or more system memory devices, or other suitable long-term storage devices. The system memory devices may then retrieve the requested data and forward it to the memory control unit. The retrieved data may then be sent to and stored in memory 403 via the on-chip network. The process of storing such data in one of the cache memory partitions is commonly referred to as a "cache fill."

In some cases, circuitry 401 may receive instructions from a processor or processor core to update data stored in memory 403 for which this processor does not yet have write access right. In such cases, duplicate copies of the data existing in other cache memory partitions may be out-of-date with the to-be-updated data in memory 403. Circuitry 401 may then send a request to the coherence engine hosting the directory. The coherence engine hosting the directory may send invalidation requests to other cache memory partitions that hold the to-be-updated data and may then grant write access rights to the requesting processor. At a later time, cache lines with updated data (commonly referred to as "dirty cache line") may be evicted from their respective cache lines. In some embodiments, the system memory may be updated at that time. The process of updating system memory with updated cache data is commonly referred to as a "write-back." As described below in more detail in regard to FIG. 5, a coherence engine may receive requests to schedule a write-back of the newly updated data to other storage locations.

It is noted that the embodiment illustrated in FIG. 4 is merely an example. In other embodiments, different numbers of partitions, and different numbers of registers, are possible and contemplated.

Figure 5:
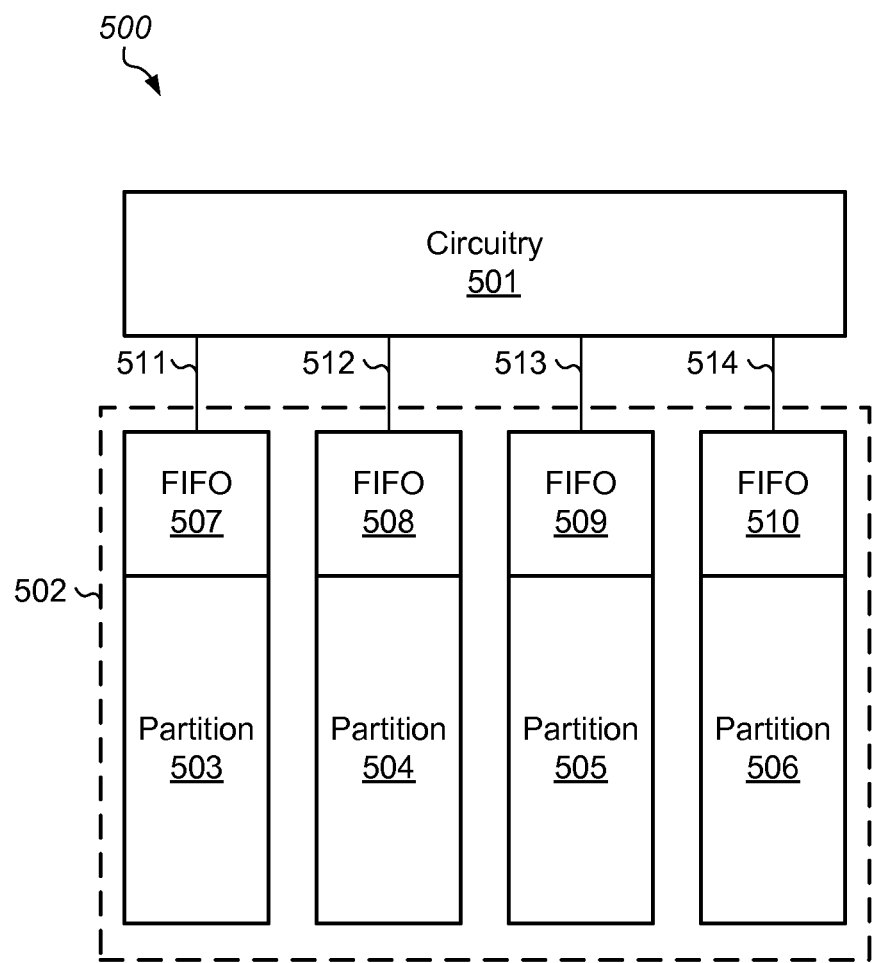
FIG. 5 illustrates a block diagram of an embodiment of a coherence engine.

An embodiment of a coherence engine is illustrated in FIG. 5. In various embodiments, coherence engine 500 may correspond to any one of coherence engines 203a-b as depicted in FIG. 2. In the illustrated embodiment, coherence engine 500 includes circuitry 501 and directory memory 502. Circuitry 501 may be coupled to directory memory 502 via busses 511 through 514.

Circuitry 501 may include a combination of logic gates configured to perform specific tasks, such as, e.g., maintain coherence for one or more cache memory partitions, for example. In some embodiments, circuitry 501 may include one or more state elements, such as, e.g., flip-flops or latches, which may be included in a sequential logic circuit (commonly referred to as a "state machine") configured to perform various tasks relating to the operation of coherence engine 500. Circuitry 501 may, in other embodiments, include a general-purpose processor configured to execute program instructions. While circuitry 501 is shown, in the illustrated embodiment, as being included in coherence engine 500, in some embodiments, the circuitry may be located in another functional unit or may be shared with another coherence engine.

Directory memory 502 may, in various embodiments, include multiple data storage cells, such as, dynamic storage cells, static storage cells, non-volatile storage cells, or any suitable data storage cell. In some embodiments, directory memory 502 may include dual-port data storage cells allowing read and write operations to be performed in parallel. In some embodiments, directory memory 502 may be configured to store a data structure (commonly referred to as a "directory"), which indicates the state of data stored in one or more cache memories.

Different computing systems may store different state information for each cache entry. For example, some computing systems may employ the MOESI protocol in which "M" indicates a cache entry is exclusive and dirty, "O" indicates a cache entry is shared and dirty, "E" indicates a cache entry is exclusive and clean, "S" indicates a cache entry is shared and clean, and "I" indicates a cache entry is invalid.

The state of system memory corresponding to a given cache entry may, in some embodiments, be inferred by the state information of the cache entry. If there are no dirty versions of a cache entry, then the system memory corresponding to the cache entry is up-to-date. Alternatively, if there is a dirty cache entry, then the associate system memory is out-of-date, and a write-back may be requested in order to copy the updated version of the data in the cache memory, back to system memory. Directory memory 502 may also be updated for clean cache line victimizations within the system.

It is noted that in some embodiments, the directory may be interleaved amongst directory memories, such as, e.g., directory memory 502 included in various coherence engines within a computing system. Other embodiments may include multiple Application-Specific Integrated Circuits (ASICs), each of which includes a directory memory that may be configured to store a portion of the overall directory.

In the illustrated embodiment, directory memory 502 includes directory partitions 503 through 506, and First-In First-Out memories (FIFOs) 507 through 510. Each of directory partitions 503 through 506 is coupled to a respective one of FIFOs 507 through 510, which are, in turn, coupled to circuitry 501 via a respective one of busses 511 through 514. Each of directory partitions 503 through 506 may, in some embodiments, may carry the same address information and be operated in parallel, i.e., accessed concurrently in response to a look-up request to inquire if a particular piece of data is stored in some processor's cache memory. In such cases, each of busses 511 through 514 may be used to transfer the look-up request's address information to each of directory partitions 503 through 506. During an update to directory memory 502 for write-backs, a single directory partition that includes information corresponding to the cache state of the processor evicting the cache line may be accessed. In such cases, multiple write-back or clean victimization updates may be performed in parallel if their updates are to be performed to different directory partitions. In such cases, each of busses 511 through 514 may be used to transfer different address information to each of directory partitions 503 through 506.

It is noted that the embodiment illustrated in FIG. 5 is merely an example. Although four directory partitions are depicted in the embodiment illustrated in FIG. 5, in other embodiments, any suitable number of directory partitions may be employed.

Figure 6:
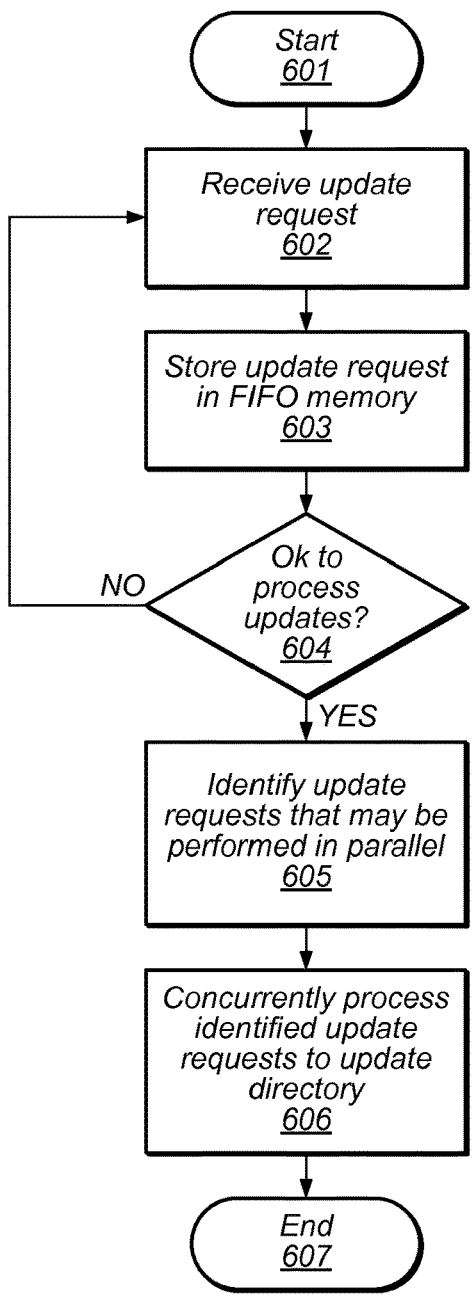
FIG. 6 illustrates a flow diagram depicting an embodiment of method for operating a directory memory.

Turning to FIG. 6, a flow diagram depicting an embodiment of a method for operating a directory memory is illustrated. The method begins in block 601. A directory memory update request that may include write-back or clean victimization request may then be received (block 602). In various embodiments, the received write-back request may include or imply a request to copy recently updated data from a cache memory to a system memory or other suitable system storage device.

The received write-back or clean victimization request may then be stored in a First-In First-Out (FIFO) memory to allow accumulation of requests for updating the directory memory (block 603). For example, in some embodiments, the received write-back or clean victimization request may be stored in a given one of FIFOs 507-510 as depicted in FIG. 5. The method may then depend on if it is acceptable to process stored write-back and clean victimization requests (block 604).

The determination if it is acceptable to process the stored write-back and clean victimization requests may be made according to one of various techniques. In some embodiments, a level of activity (including cache-access requests, cache-fill requests, and the like) may be compared to a predetermined threshold value. Additionally or alternatively, a number of stored write-back and clean victimization requests may be compared to another predetermined threshold value. In both cases, the threshold values may be programmable to allow for adjusting aspects of system performance. In some embodiments, cache fills may be given priority over processing write-back and clean victimization requests.

When a determination is made that it is not acceptable to process the stored write-back and clean victimization requests, the method may proceed as described above from block 602. If, however, a determination is made that the write-back and clean victimization requests may be processed, write-back and clean victimization requests that may be processed concurrently may be identified (block 605). In some embodiments, write-back and clean victimization requests in different directory partitions, such as, e.g., pending requests at the outputs of FIFO 507-510, may be selected. Since each of directory partitions 503-506 is accessed using a respective one of busses 511-514, multiple directory partitions may be accessed in parallel, thereby allowing multiple write-back and clean victimization requests to be processed updating the directory partitions 503-506 concurrently.

Once a group of write-back and clean victimization requests have been identified for concurrent processing, each of the identified write-back and clean victimization requests may be then processed concurrently (block 606) to update the directory. The method may then conclude in block 607.

It is noted that the method illustrated in FIG. 6 is merely an example. In other embodiments, different operations, and different orders of operation are possible and contemplated.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a memory configured to store a plurality of entries wherein each entry of the plurality of entries includes information indicative of a coherency state of a respective entry in a cache memory;
   circuitry configured to:
     receive an update request, wherein the update request includes a request to update information associated with a particular entry of the plurality of entries corresponding to a particular entry at a given location in the cache memory;
     store the update request;
     determine a number of stored update requests and a number of access requests to the cache memory;
     based on results of a comparison of the number of stored update requests and a first threshold value and another comparison of the number of access requests to a second threshold value:
       select a subset of a plurality of previously stored update requests to process concurrently; and
       concurrently process each update request of the subset of the plurality of previously stored update requests.

2. The apparatus of claim 1, wherein the memory includes a plurality of partitions, wherein each partition of the plurality of partitions is configured to be accessed in parallel with at least one other partition of the plurality of partitions.

3. The apparatus of claim 2, wherein the memory further includes a plurality of First-In First-Out (FIFO) memories, wherein each FIFO memory of the plurality of FIFO memories is coupled to a respective partition of the plurality of partitions.

4. The apparatus of claim 3, wherein to store the update request, the circuitry is further configured to store the update request in a given one of the plurality of FIFO memories.

5. The apparatus of claim 1, wherein to select the subset of the plurality of previously stored update requests, the circuitry is further configured to select, using a number of previously stored update requests, the subset of the plurality of previously stored update requests.

6. The apparatus of claim 1, wherein to concurrently process each update request, the circuitry is further configured to perform a write-back operation or a clean victimization operation.

7. A method, comprising:
  receiving an update request, wherein the update request includes a request to update a particular entry of a plurality of entries in a memory, wherein each entry of the plurality of entries includes information indicative of a coherency state of a respective entry in a cache memory;
  storing the update request;
  determining a number of stored update requests and a number of access requests to the cache memory;
  based on results of comparing of the number of stored update requests and a first threshold value, and comparing of the number of access requests and a second threshold value:
    selecting a subset of a plurality of previously stored update requests to process concurrently; and
    concurrently processing each update request of the subset of the plurality of previously stored update requests.

8. The method of claim 7, wherein the memory includes a plurality of partitions, wherein each partition of the plurality of partitions is configured to be accessed in parallel with at least one other partition of the plurality of partitions.

9. The method of claim 8, wherein the memory further includes a plurality of First-In First-Out (FIFO) memories, where each FIFO memory of the plurality of FIFO memories is coupled to a respective partition of the plurality of partitions.

10. The method of claim 9, storing the update request further comprises storing the update request in a given one of the plurality of FIFO memories.

11. The method of claim 7, wherein selecting the subset of the plurality of previously stored update requests comprises determining a level of activity of the cache memory.

12. The method of claim 7, wherein concurrently processing each update request includes performing a write-back operation or a clean victimization operation.

13. A system, comprising:
  a system memory;
  a cache memory;
  a coherence engine, including a memory configured to store a plurality of entries, wherein each entry of the plurality of entries includes information indicative of a coherency state of a respective entry in the cache memory and a circuit configured to:
    receive an update request, wherein the update request includes a request to update a particular entry of the plurality of entries corresponding to a particular entry at a given location in the cache memory;
    store the update request;
    determine a number of stored update requests and a number of access requests to the cache memory;
    based on results of a comparison of a number of stored update requests and a first threshold value, and another comparison of the number of access requests and a second threshold value:
      select a subset of a plurality of previously stored update requests to process concurrently; and
      concurrently process each update request of the subset of the plurality of previously stored update requests.

14. The system of claim 13, wherein the memory includes a plurality of partitions, wherein each partition of the plurality of partitions is configured to be accessed in parallel with at least one other partition of the plurality of partitions.

15. The system of claim 14, wherein the memory further includes a plurality of First-In First-Out (FIFO) memories, wherein each FIFO memory of the plurality of FIFO memories is coupled to a respective partition of the plurality of partitions.

16. The system of claim 15, wherein to store the update request, the circuit is further configured to store the update request in a given one of the plurality of FIFO memories.

17. The system of claim 13, wherein to select the subset of the plurality of previously stored update requests, the circuit is further configured to select the subset of the plurality of previously stored update requests dependent upon a number of previously stored update requests.

18. The system of claim 13, wherein to concurrently process each update request, the circuit is further configured to perform a write-back operation or a clean victimization operation.

* * * * *